April 1, 1924.

J. J. FLYNN

HARVESTER

Original Filed Aug. 12, 1919    3 Sheets-Sheet 1

1,488,487

Inventor

John J. Flynn.

By Harry C. Schroeder
Attorney

April 1, 1924.

J. J. FLYNN

HARVESTER

Original Filed Aug. 12, 1919   3 Sheets-Sheet 2

1,488,487

Inventor
John J. Flynn.
By Harry C. Schroeder
Attorney

April 1, 1924. 1,488,487
J. J. FLYNN
HARVESTER
Original Filed Aug. 12, 1919   3 Sheets-Sheet 3

Inventor
John J. Flynn.

By Harry C. Schroeder
Attorney

Patented Apr. 1, 1924.

1,488,487

UNITED STATES PATENT OFFICE.

JOHN J. FLYNN, OF WATSONVILLE, CALIFORNIA.

HARVESTER.

Application filed August 12, 1919, Serial No. 317,021. Renewed February 19, 1924.

*To all whom it may concern:*

Be it known that I, JOHN J. FLYNN, a citizen of the United States, residing at Watsonville, in the county of Santa Cruz and State of California, have invented certain new and useful Improvements in Harvesters, of which the following is a specification.

My invention is a harvester particularly useful for harvesting beans.

Referring to the annexed drawings, forming a part of this specification:

Figure 1:
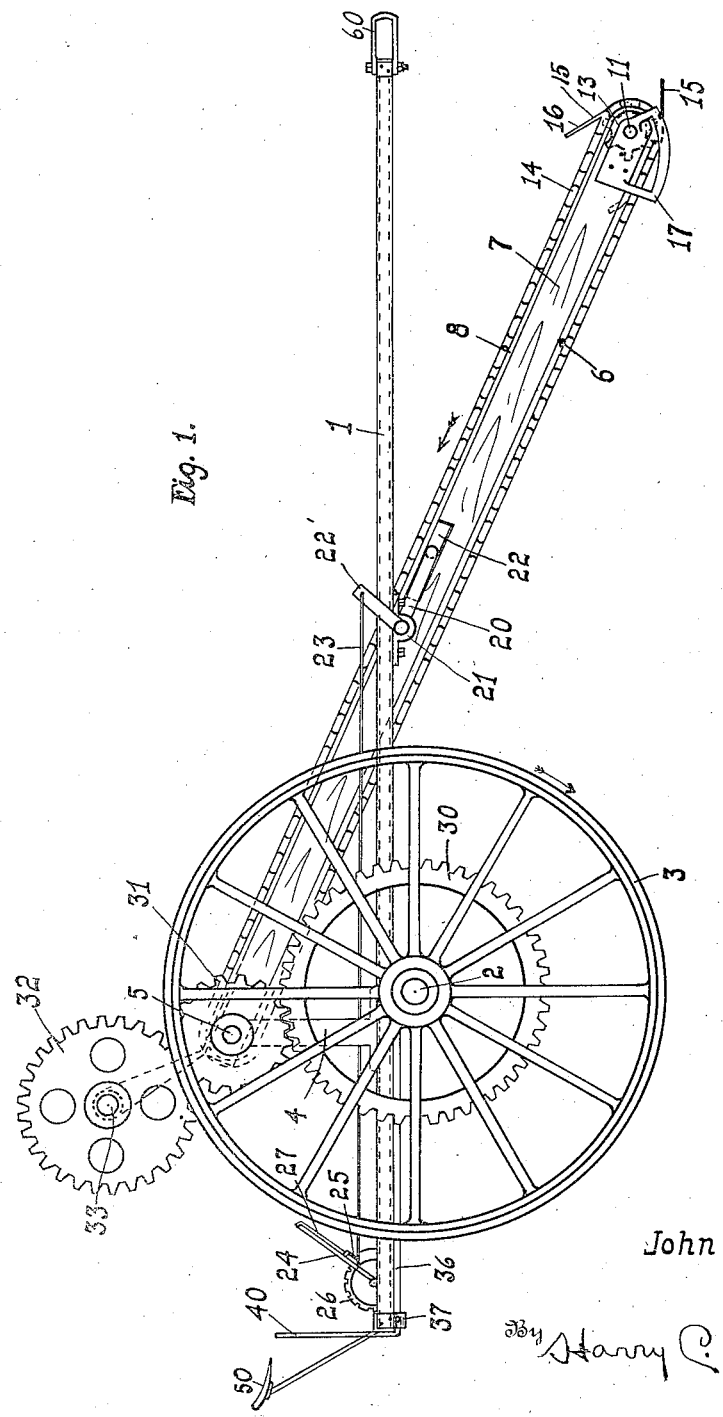
Figure 1 is a side elevation of my harvester.
Figure 2:
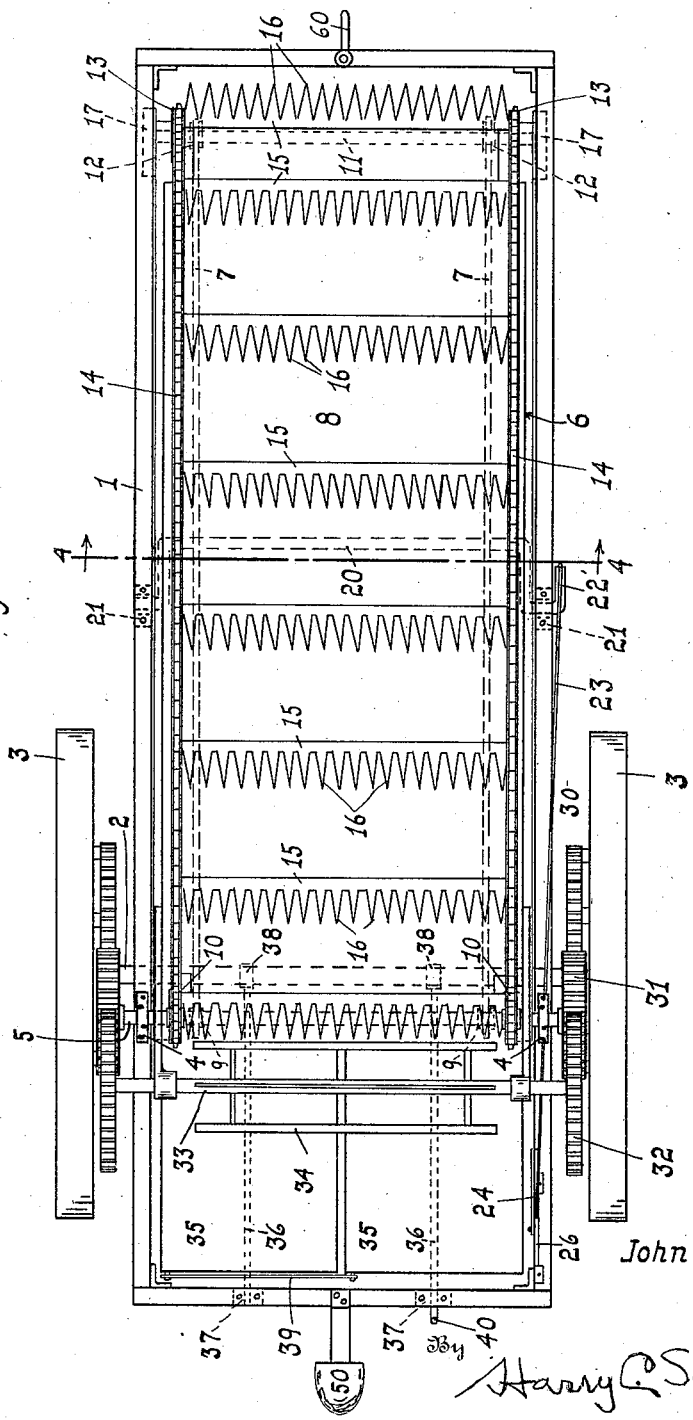
Figure 2 is a plan thereof.
Figure 3:
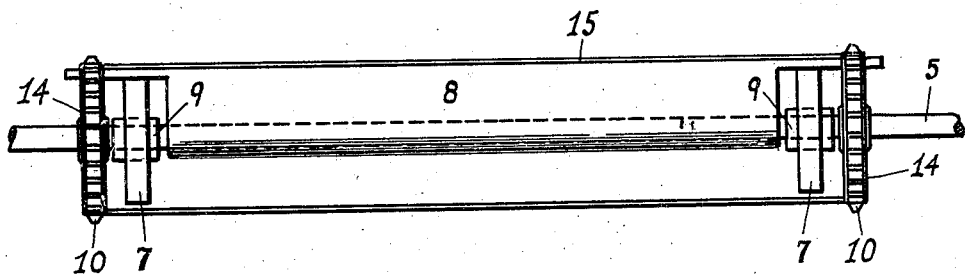
Figure 3 is a rear view of the swinging frame and the harvester mechanism mounted thereon.
Figure 4:
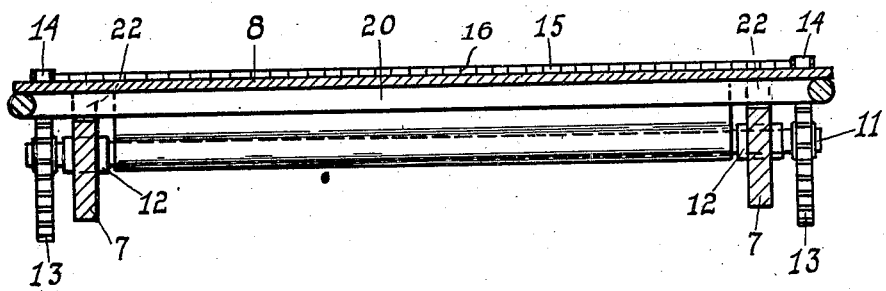
Figure 4 is a cross section on line 4—4 of Figure 2.

In the drawings 1 indicates a rectangular main frame which is mounted on an axle 2 on the ends of which axle are journaled wheels 3. In brackets 4, upstanding from the frame 1 at the rear of axle 2, is journaled a shaft 5 extending transversely of said frame. A swinging frame 6, including side beams 7 and a top plate 8 secured to the upper edge of said side beams, is fulcrumed at its rear end on shaft 5 extending through said side beams and journaled in bearings 9 in said side beams. Sprockets 10 are secured on shaft 5 respectively within the side edges of plate 8, said plate being cut away to accommodate the sprockets. In the lower front end of frame 6 a shaft 11 extending transversely of the frame is journaled in bearing 12 in side beams 7, on which shaft are secured sprockets 13 within the side edges of plate 8, said plate being cut away to accommodate the sprockets. Chains 14 respectively travel over sprockets 10 and 13 and over the plate 8 at the side edges of the plate. Transverse prong bars 15, including prongs 16, are secured at their ends to the chains 14 at an angle to said chains so that the prongs extend forwardly and horizontally when the bars are in their lowermost forward position and upwardly at an angle while traveling upwardly over the plate 8. Shoes 17 are secured to the lower end of the frame 6 for engaging the ground and supporting the chains 14 and prong bars 15 above the ground. A crank 20 is journaled in bearings 21 secured to the lower side of the side members of the main frame 1 and extends through slots 22 in the side beams 7 of frame 6. Said crank has an arm 22' at one end to which is connected one end of a rod 23, the other end of which is connected to an operating lever 24 pivoted on the rear end of frame 1. On said lever is mounted a pawl 25 for engaging a toothed segment 26. A rod 27 is mounted on said lever for actuating said pawl. A gear 30 is secured to one of the wheels 3 which meshes with a gear 31 secured on shaft 5. The gear 31 in turn meshes with a gear 32 secured on a shaft 33 extending transversely of frame 1 and journaled in the top of brackets 4 above and to the rear of the rear end of frame 6. A reel 34 is secured on shaft 33 for pushing the beans off the prongs 16 at the upper rear end of frame 6. Platforms 35 are mounted on rods 36 journaled in bearings 37 and 38 secured respectively on the rear end member of frame 1 and on axle 2. A link 39 is connected respectively to the inner edge of one of said platforms and to the outer edge of the other platform so that the inner edges of said platforms swing down together. An arm 40 is secured to the rear end of one of the rods 36 for swinging the platforms 35 on their fulcrums. A seat 50 is mounted on the rear end of frame 1 in such position that the operator sitting on said seat may reach lever 24 and arm 40. A coupling 60 is secured to the forward end of frame 1 for coupling the frame to a tractor or for hitching the frame to a horse.

The operation of my invention is as follows:

The forward end of the frame 6 is let down upon the ground by its weight upon releasing the lever 24. As the machine is drawn forwardly the chains 14 and prong bars 15 are caused to travel upwardly over the plate 8, through the medium of gears 30, 31, shaft 5 and sprockets 10 and 13, while the reel 34 is caused to rotate clockwise by gear 32 meshing with gear 31, whereupon the prong bars 15 pull up the bean plants and carry them upwardly over the frame plate 8 and deposit them upon the platforms 35, the reel 34 assisting in so depositing the plants. When a sufficient pile of plants has been deposited on platforms 35 the operator swings arm 40 and the platforms 35 and dumps the plants on the ground. The frame 6 and parts thereon may be swung upwardly and locked out of operation by pulling the lever 24 backwardly and engaging a rear tooth of the segment 26 with pawl 25.

Having described my invention, I claim:

In a harvester, a main frame, wheels whereby the frame is supported, a gear on each wheel, a bracket extending perpendicular to the main frame on each side thereof, a shaft journaled in the upper end of the brackets, gears carried by the shaft and meshing with the gears on the wheels, sprockets mounted on the shaft, a swinging frame fulcrumed on the shaft, a shaft journaled in the opposite end of the swinging frame, sprockets on said last mentioned shaft, a chain adapted to pass over the sprockets, means carried by the chains whereby plants may be pulled from the ground and carried to the back of the harvester, a second set of brackets extending upwardly and rearwardly from the upper ends of the first brackets, a second shaft journaled in the second brackets, gears mounted on said shaft and adapted to mesh with the gears carried by the first mentioned shaft and means carried by the second shaft whereby the plants may be removed from the chains.

In testimony whereof I affix my signature.

JOHN J. FLYNN.